(12) United States Patent
Addy et al.

(10) Patent No.: US 7,096,001 B2
(45) Date of Patent: Aug. 22, 2006

(54) SECURITY SYSTEM WITH TELEPHONE CONTROLLER

(75) Inventors: Kenneth L Addy, Massapequa, NY (US); Herbert M. Lustig, Old Greenwich, CT (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/404,950

(22) Filed: Apr. 1, 2003

(65) Prior Publication Data

US 2004/0204019 A1 Oct. 14, 2004

Related U.S. Application Data

(60) Provisional application No. 60/434,854, filed on Dec. 18, 2002.

(51) Int. Cl.
*H04M 11/04* (2006.01)

(52) U.S. Cl. .................. 455/404.1; 455/557; 340/5.64

(58) Field of Classification Search ............... 455/557, 455/462, 463, 404.1, 420, 419, 404.2; 340/539.11, 340/539.1, 5.6–5.64, 5.71, 5.72
See application file for complete search history.

(56) References Cited

U.S. PATENT DOCUMENTS

| 4,559,526 | A | * | 12/1985 | Tani et al. ............... 340/539.3 |
| 4,791,658 | A | | 12/1988 | Simon et al. |
| 4,809,316 | A | * | 2/1989 | Namekawa .............. 455/404.1 |
| 5,081,667 | A | | 1/1992 | Drori et al. |
| 5,268,668 | A | * | 12/1993 | Berube ....................... 340/505 |
| 5,457,730 | A | | 10/1995 | Rounds |
| 5,546,071 | A | | 8/1996 | Zdunich |
| 5,587,701 | A | | 12/1996 | Hess |
| 5,714,933 | A | | 2/1998 | Le Van Suu |
| 5,745,849 | A | | 4/1998 | Britton |
| 5,777,551 | A | | 7/1998 | Hess |
| 5,805,064 | A | * | 9/1998 | Yorkey ....................... 340/550 |
| 5,850,180 | A | | 12/1998 | Hess |
| 6,006,088 | A | | 12/1999 | Couse |
| 6,049,273 | A | * | 4/2000 | Hess ..................... 340/539.11 |
| 6,104,783 | A | | 8/2000 | DeFino |

(Continued)

FOREIGN PATENT DOCUMENTS

EP     1 087 602     3/2001

(Continued)

*Primary Examiner*—Charles N. Appiah
(74) *Attorney, Agent, or Firm*—Anthony R. Barkume, P.C.

(57) ABSTRACT

A combination telephone set (such as a cordless phone) and security system control device that has a first interface means for interfacing the control device with a security system bus, a second interface means for interfacing the control device with a telephone network such as the PSTN, and a user interface means with an input means for providing user control information to the control device, the input means including means for a user to switch the control device between a telephone mode and a security system mode, an output means for providing status data to a user regarding operation of the control device, and adapted to enable a user to communicate over the telephone network when the security device is in the telephone mode. Processing means controls operation of the control device, and is adapted to switch between a telephone mode and a security system mode on receipt of a user command from the input means. When in the telephone mode, the processing means sends and receives telephony information between the user interface means and the second interface means; when in the security system mode, the processing means sends and receives security system information between the user interface means and the first interface means.

30 Claims, 4 Drawing Sheets

U.S. PATENT DOCUMENTS

| | | | |
|---|---|---|---|
| 6,104,785 A * | 8/2000 | Chen | 379/49 |
| 6,173,169 B1 | 1/2001 | Oh | |
| 6,226,357 B1 * | 5/2001 | Pildner | 379/37 |
| 6,373,374 B1 | 4/2002 | Siemens | |
| 6,441,731 B1 * | 8/2002 | Hess | 340/539.26 |
| 6,501,969 B1 | 12/2002 | Cannon et al. | |
| 6,799,031 B1 * | 9/2004 | Lewiner et al. | 455/404.1 |
| 2001/0050976 A1 * | 12/2001 | Simon et al. | 379/39 |
| 2001/0055954 A1 | 12/2001 | Cheng | |
| 2004/0123149 A1 * | 6/2004 | Tyroler | 713/201 |

FOREIGN PATENT DOCUMENTS

| | | |
|---|---|---|
| JP | 59219038 | 12/1984 |
| JP | 2001028635 | 1/2001 |
| WO | WO 98/49663 A1 * | 11/1998 |
| WO | WO 00/75900 A1 | 12/2000 |
| WO | WO 01/22701 A1 | 3/2001 |

* cited by examiner

SECURITY SYSTEM WITH TELEPHONE CONTROLLER

CROSS-REFERENCE TO RELATED APPLICATIONS

This application claims priority of co-pending U.S. provisional application Ser. No. 60/434,854, filed on Dec. 18, 2002; which is incorporated by reference herein.

BACKGROUND OF THE INVENTION

The present invention relates to security systems, and in particular to the use of a telephone device for controlling a security system.

A recent innovation in security applications is the use of wireless keys, which are small remote control devices, typically attached to a key-fob. These devices have become popular for remote arming and disarming as well as remote control of other devices via the wireless receiver and central control unit. For example, Ademco products in the 5800 series of products, specifically the 5881 receiver which receives messages from a 5804 wireless key and passes the complete message to the control panel for some resultant action. In addition, two way devices, e.g. Ademco 5804BD, send information to the system then receive an acknowledgment back via the system bus and central transmitter module, 5800TM, which transmits to a receiver contained within the 5804BD.

Thus, a basic system consists of a central control unit, a wired console (on the system bus), a wireless receiver (also on the system bus), a central transmitter module (also on the bus), and various wireless sensors and wireless control transmitters in communication with the control unit via the receiver, bus and transmitter module.

One of the major advantages of a wireless system is that there is lower installation time since the sensors do not require wiring back to the control panel. Additionally the use of wireless-key transmitters for remote control adds convenience and provides for improved security, e.g. system status can be interrogated before entering the protected premises, lights may be activated etc.

Two way control devices have proven to be successful in the field over recent years. Although these devices are often used from outside the protected premises, they are often used inside from a night stand or back-door/garage entrance. In addition, it should be noted that cordless telephones now account for more than 50% of telephones sold in USA (1998). It has been noted that the user interface on a device which has dual purpose (such as a telephone used for security system control as well as standard telephonic communications) can be cumbersome, a special access code is needed to make sure that the signal from the cordless telephone handset is sent to the proper place, i.e. either control information to the alarm system or dialing information over the PSTN.

SUMMARY OF THE INVENTION

An improvement to such a combination device is the intent of the present invention, which is the addition of a "hot-key" or dedicated security mode key, which when pressed sends a unique alarm system access code and places the cordless phone in a security mode of operation. Thus, an end-user has a simple single button access to the security system from the cordless telephone handset.

It is therefore an object of the present invention to provide a combination device which includes the functionality of a remote control security transmitter with a cordless telephone.

It is a further object of the present invention to provide improved security by means of a combined security transmitter and cordless telephone.

It is a further object of the present invention to provide improved security system user-interface by means of a combined security transmitter and cordless telephone.

Provided is a combination telephone set and security system control device that has a first interface means for interfacing the control device with a security system bus and a second interface means for interfacing the control device with a telephone network such as the PSTN. The control device also has a user interface means with an input means for providing user control information to the control device, the input means including means for a user to switch the control device between a telephone mode and a security system mode. The user interface also has an output means for providing status data to a user regarding operation of the control device. The user interface means is adapted to enable a user to communicate over the telephone network when the security device is in the telephone mode.

The control device also has processing means for controlling operation of the control device, the processing means adapted to switch between a telephone mode and a security system mode on receipt of a user command from the input means. When the security device is in the telephone mode, the processing means sends and receives telephony information between the user interface means and the second interface means; and when the security device is in the security system mode, the processing means sends and receives security system information between the user interface means and the first interface means.

The control device may be embodied in several embodiments, including a stand-alone speakerphone-type device, a standard telephone device, or a cordless phone having wireless communications between the handset and the base station. In the case of a stand-alone speakerphone, the first interface means, second interface means, user interface means, and processing means are all integrated within a single housing. The standard telephone device embodiment includes a base station and a handset, wherein the user interface means comprises a speaker and microphone within the handset for enabling a user to communicate over the telephone network when the security device is in the telephone mode.

In the cordless phone embodiment, the handset interoperates by wireless communications with the base station, and the handset further includes the user interface means and a first wireless transceiver means for communicating with the base station. The base station includes the processing means, the first interface means, the second interface means, and a second wireless transceiver means for communicating with the handset.

The means for a user to switch the control device between a telephone mode and a security system mode may be a dedicated button on the handset, or it may be detection of a predetermined series of keypresses on a numeric keypad.

The output means may include a display for providing a visual indication of status data to a user regarding operation of the control device, wherein the status data indicated on the display indicates status of the security system when the security device is in the security system mode. The output

DETAILED DESCRIPTION OF THE PREFERRED EMBODIMENT

The present invention, which is a telephone set adapted to interface with and control a security system, may be implemented in any type of telephone set; i.e. a standard phone with a tethered handset, a cordless phone with wireless communications between the handset and the base station, or a fully integrated speakerphone with any separate handset. The invention will be described with respect to a cordless phone, which is an optimal embodiment since the untethered handset allows the user to roam around the premises with the handset and still have control of the security system in accordance with the invention.

Figure 1:
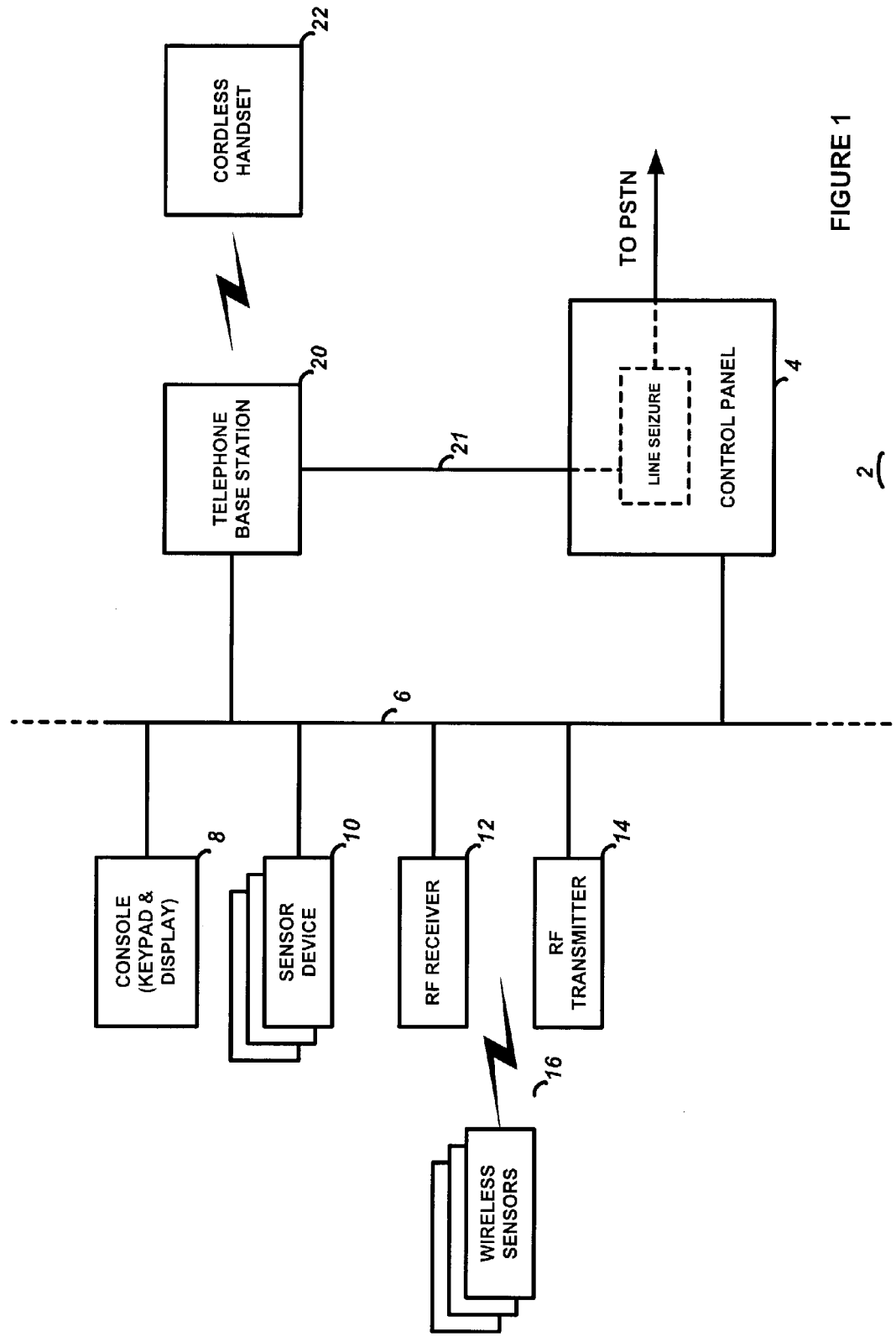
FIG. 1 is a block diagram of the system of the present invention.

FIG. 1 illustrates a security system 2 that includes a control panel 4, a console keypad and display 8, a plurality of sensor devices 10, an RF receiver 12, and an RF transmitter 14, all of which communicate via a wired system bus 6. The sensor devices 10 detect changes in the surrounding environment and are well known in the art, such as passive infrared motion detectors, glass break detectors, magnetic reed switches, and the like. The RF receiver and transmitter communicate with one or more wireless devices 16 that may monitor the environment as described above. The control panel is configured to monitor the status of the sensor devices and indicate an alarm condition under predetermined conditions, and may dial a central alarm station and/or sound a local siren to indicate an alarm condition. All of these devices and their operation are well known in the art of security systems and need not be described further.

FIG. 1 also illustrates a cordless telephone base station 20 connected to the security system bus 6. The telephone base station 20 must be adapted to interface with the security system bus 6; i.e. it must have appropriate driver hardware circuits and software control to interoperate with the control panel. The base station 20 would be adapted in accordance with the particular protocols utilized by the manufacturer of the security system. Security system protocols, such as a serial data transfer protocol, are well known in the art and need not be repeated here.

The base station 20 is also shown interconnected by connection 21 via the control panel 4 with the PSTN (public switched telephone network), such as by an RJ11 connector as well known in the art. The telephone base station 20 connects to the PSTN via the control panel 4, since the control panel 4 performs line seizure to take over the phone line and dial the central station as known in the art. Optionally, the base station 20 can connect directly to the PSTN if central station dialing functions are not implemented. Also shown in FIG. 1 is a cordless phone handset 22, which operates in a wireless fashion with the base station 20 as well known in the art. Currently, most cordless phones operate in the 2.4 GHz range, although 900 MHz sets are still in use. The specifics of the wireless communications between the handset 22 and the base station 20 are unimportant to the present invention.

Figure 2:
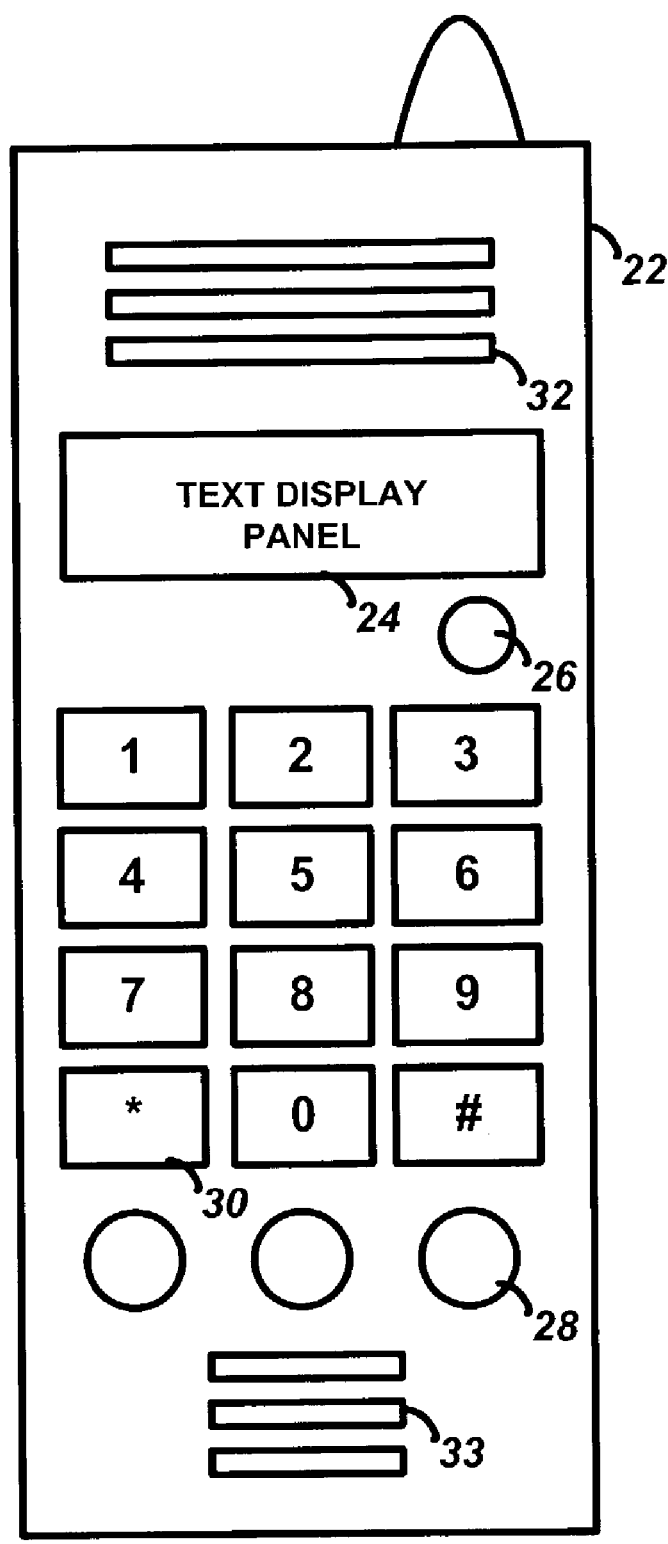
FIG. 2 is an illustration of the handset.
Figure 3:
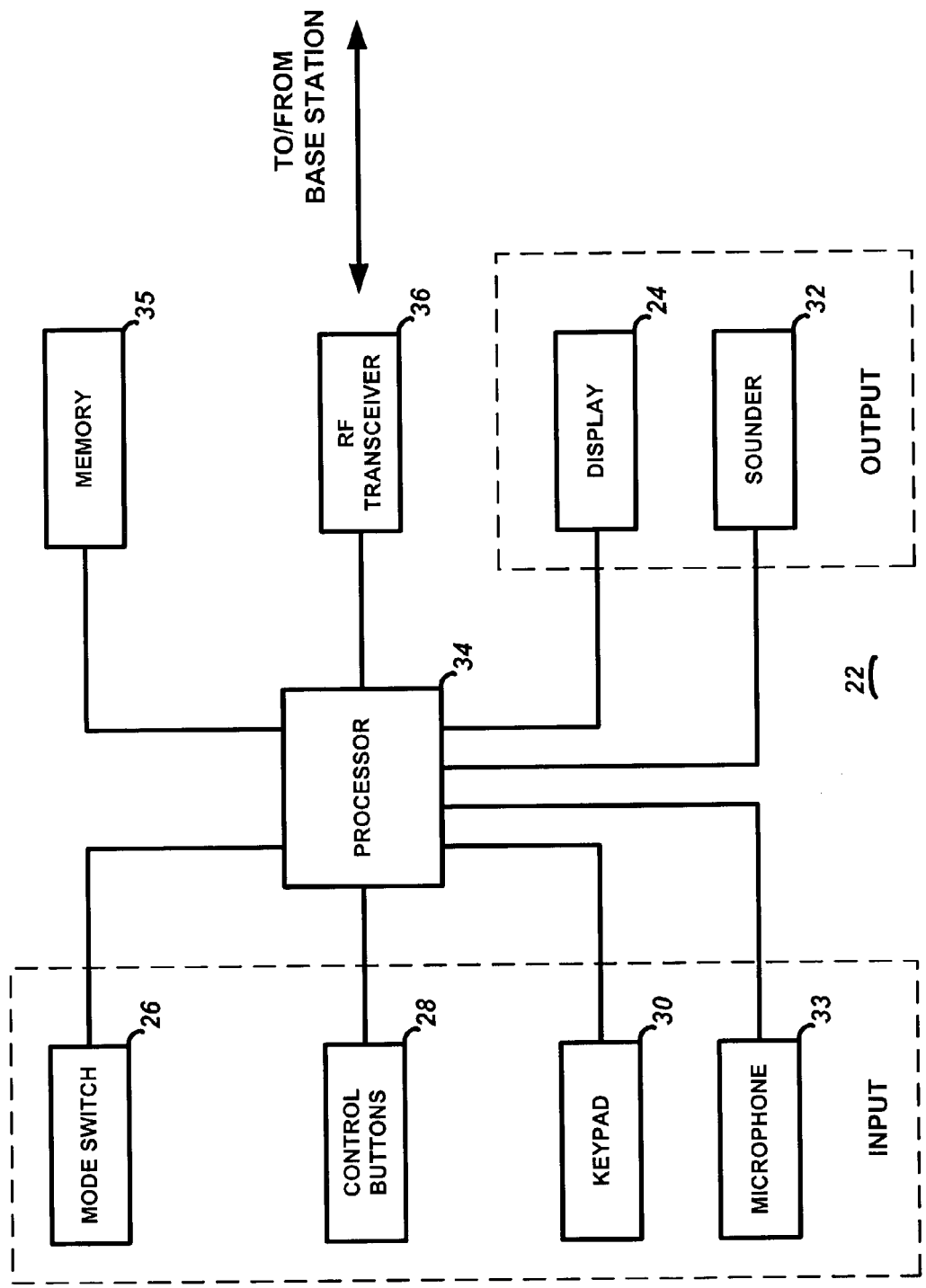
FIG. 3 is a block diagram of the handset.

The preferred embodiment of the present invention is a device comprising a cordless telephone with a single button for access to security mode. As shown in FIGS. 2 and 3, the cordless telephone handset 22 has input means including a keypad 30, a microphone 33, a security mode switch 26, and telephone control buttons 28 (e.g. redial, mute, etc.). The handset also has output means including a display 24 and a speaker (sounder) 32. Internal to the handset are a microcontroller or processor 34, a non-volatile memory 35, and radio frequency transmitter/receiver and telephony circuits 36.

The unique security mode switch 26 immediately enables the remaining buttons 28 and the keypad 30 as security function buttons and puts the alarm control panel 4 into a mode of operation suitable for interaction with the phone 22 via the alarm system bus 6. By pressing the mode switch 26, a command is sent from the handset 22 to the base station 20 that instructs the base station to communicate subsequent data messages to the security system bus 6, and not over the PSTN. If the security mode switch 26 is not pressed, then the cordless handset 22 and base station 20 act as a normal telephone system and communicate only with the PSTN via connection 21. A subsequent press of the mode switch 26 instructs the base station 20 to return to normal telephony mode. Continuous (i.e. a several second press) of the mode switch 26 raises a "panic" transmission to the alarm system. In addition, once the handset 22 has been placed into the security mode by pressing mode switch 26, some or all of the remaining input buttons 28, 30 are placed into a dedicated security mode wherein pressing them will send predefined data messages to the control panel 4 via the bus 6. For example, one of the buttons 28 (e.g. a redial button in telephony mode) could be programmed to request system status, another could be a panic button, etc.)

The radio frequency transmitter 36 within the handset 22 is controlled by a processor 34 and sends system messages in response to activation of the security mode switch 26 followed by another button or keypress. The display 24 shows the message which was sent e.g. "pnc" for panic etc.

The speaker 32 gives local feedback and is useful during programming, mode selection and to indicate when a transmission takes place. In the case of a security control message, the beeps emulate the beeps generated by the control panel console.

Figure 4:
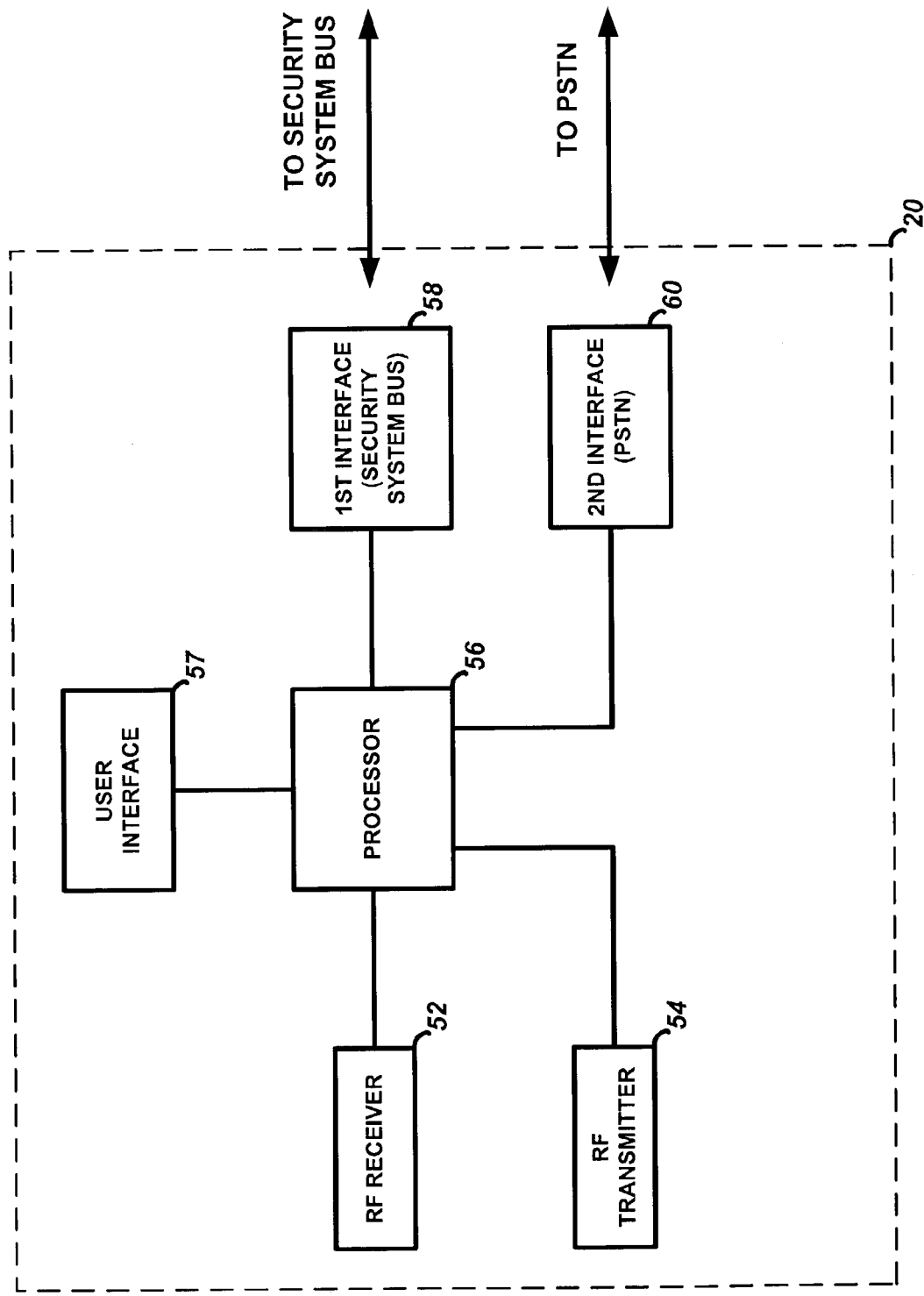
FIG. 4 is a block diagram of the base station.

FIG. 4 illustrates the basic components of the base station 20 in accordance with the invention. The base station 20 has an RF receiver/transmitter 52, 54, a processor 56, a security system bus interface 58, an optional user interface 57, and a PSTN interface 60. When the processor 56 receives a data message from the handset 22 indicating that the security mode button has been pressed, then it will switch the data communications from the PSTN interface 60 to the security system bus interface 58. That is, the user pressing the security mode switch informs the base station to send subsequent data messages to the security system bus, and not over the PSTN. Likewise, when the button has been pressed again, the data messages are then sent over the PSTN instead of the security system bus.

In the alternative to a dedicated button 26 on the handset for sending the system onto security system controller mode, the present invention contemplates using a speed dial button programmed accordingly. Thus, the user might press *, 9 to enter security system mode and vice versa.

In a corded (tethered) handset type of telephone, the functions illustrated in FIG. 3 may be located within the handset as with the cordless phone (except that the RF transceiver 36 is replaced with appropriate wired communications circuitry), or some of the interface functions mat be located in the base station. For example, a simple embodiment would have only the sounder/speaker 32 and microphone 33 in the handset, with the keypad 30, buttons 26, 28, and display 24 in the base station. These design choices are implemented without affecting the scope of the present invention.

Likewise, the present invention may be embodied in a completely integrated speaker phone, with no separate handset, and still operate under the principles of the present invention.

What is claimed is:

1. A combination telephone set and security system control device comprising:
   a. first interface means for interfacing the control device with a security system bus adapted to interconnect with a control panel and a plurality of alarm sensors;
   b. second interface means for interfacing the control device with a telephone network;
   c. user interface means comprising:
      i. input means for providing user control information to the control device; said input means comprising means for a user to switch the control device between a telephone mode and a security system mode;
      ii. output means for providing status data to a user regarding operation of the control device;
      iii. said user interface means also adapted to enable a user to communicate over the telephone network when the control device is in the telephone mode; and
   d. processing means for controlling operation of the control device, the processing means adapted to:
      i. switch between a telephone mode and a security system mode on receipt of a user command from the input means;
      ii. when the control device is in the telephone mode, send and receive telephony information between the user interface means and the second interface means; and
      iii. when the control device is in the security system mode, send and receive security system information between the user interface means and the first interface means.

2. The control device of claim 1 wherein said first interface means, said second interface means, said user interface means, and said processing means are integrated within a single housing.

3. The control device of claim 1 further comprising a base station and a handset, wherein said user interface means comprises a speaker and microphone within said handset for enabling a user to communicate over the telephone network when the control device is in the telephone mode.

4. The control device of claim 3 wherein the handset is wired to the base station.

5. The control device of claim 3 wherein the handset interoperates by wireless communications with the base station,
   wherein the handset further comprises
      the user interface means and
      a first wireless transceiver means for communicating with the base station, and
   wherein the base station comprises
      the processing means,
      the first interface means,
      the second interface means, and
      a second wireless transceiver means for communicating with the handset.

6. The control device of claim 5 wherein the means for a user to switch the control device between a telephone mode and a security system mode comprises a dedicated button on the handset.

7. The control device of claim 5 wherein the input means comprises a numeric keypad, and wherein the means for a user to switch the control device between a telephone mode and a security system mode comprises means for detecting a predetermined series of keypresses on the numeric keypad.

8. The control device of claim 5 wherein the output means comprises a display for providing a visual indication of status data to a user regarding operation of the control device.

9. The control device of claim 8 wherein the status data indicated on the display indicates status of the security system when the control device is in the security system mode.

10. The control device of claim 5 wherein the output means comprises a sounder for providing audible feedback to the user regarding operation of the control device.

11. A security system comprising:
    A. a control panel for controlling operation of the security system;
    B. a plurality of alarm sensors interconnected to the control panel;
    C. a security system bus for interconnecting the control panel with the plurality of alarm sensors; and
    D. a combination telephone set and security system control device comprising:
       a. first interface means for interfacing the control device with the security system bus;
       b. second interface means for interfacing the control device with a telephone network;
       c. user interface means comprising:
          i. input means for providing user control information to the control device; said input means comprising means for a user to switch the control device between a telephone mode and a security system mode;
          ii. output means for providing status data to a user regarding operation of the control device;
          iii. said user interface means also adapted to enable a user to communicate over the telephone network when the control device is in the telephone mode; and
       d. processing means for controlling operation of the control device, the processing means adapted to:
          i. switch between a telephone mode and a security system mode on receipt of a user command from the input means;
          ii. when the control device is in the telephone mode, send and receive telephony information between the user interface means and the second interface means; and
          iii. when the control device is in the security system mode, send and receive security system information between the user interface means and the first interface means.

12. The security system of claim 11 wherein said first interface means, said second interface means, said user interface means, and said processing means are integrated within a single housing.

13. The security system of claim 11 further comprising a base station and a handset, wherein said user interface means comprises a speaker and microphone within said handset for enabling a user to communicate over the telephone network when the control device is in the telephone mode.

14. The security system of claim 13 wherein the handset is wired to the base station.

15. The security system of claim 13 wherein the handset interoperates by wireless communications with the base station,
wherein the handset further comprises
the user interface means and
a first wireless transceiver means for communicating with the base station, and
wherein the base station comprises
the processing means,
the first interface means,
the second interface means, and
a second wireless transceiver means for communicating with the handset.

16. The security system of claim 15 wherein the means for a user to switch the control device between a telephone mode and a security system mode comprises a dedicated button on the handset.

17. The security system of claim 15 wherein the input means comprises a numeric keypad, and wherein the means for a user to switch the control device between a telephone mode and a security system mode comprises means for detecting a predetermined series of keypresses on the numeric keypad.

18. The security system of claim 15 wherein the output means comprises a display for providing a visual indication of status data to a user regarding operation of the control device.

19. The security system of claim 18 wherein the status data indicated on the display indicates status of the security system when the control device is in the security system mode.

20. The security system of claim 15 wherein the output means comprises a sounder for providing audible feedback to the user regarding operation of the control device.

21. A combination telephone set and security system control device comprising:
a. a security system bus interface circuit adapted to interface the control device with a security system bus adapted to interconnect with a control panel and a plurality of alarm sensors;
b. a telephone network interface circuit adapted to interface the control device with a telephone network;
c. a user interface comprising:
  i. a mode switch to switch the control device between a telephone mode and a security system mode;
  ii. an output device adapted to provide status data to a user regarding operation of the control device;
  iii. said user interface adapted to enable a user to communicate over the telephone network when the control device is in the telephone mode; and
d. a processing circuit adapted to:
  i. switch between a telephone mode and a security system mode on receipt of a user command from the mode switch;
  ii. when the control device is in the telephone mode, send and receive telephony information between the user interface and the telephone network interface circuit; and
  iii. when the control device is in the security system mode, send and receive security system information between the user interface and the security system bus interface circuit.

22. The control device of claim 21 wherein said security system bus interface circuit, said telephone network interface circuit, said user interface, and said processing circuit are integrated within a single housing.

23. The control device of claim 21 further comprising a base station and a handset, wherein said user interface comprises a speaker and microphone within said handset adapted to enable a user to communicate over the telephone network when the control device is in the telephone mode.

24. The control device of claim 23 wherein the handset is wired to the base station.

25. The control device of claim 23 wherein the handset interoperates by wireless communications with the base station,
wherein the handset further comprises
the user interface and
a first wireless transceiver adapted to communicate with the base station, and
wherein the base station comprises
the processing circuit,
the security system bus interface circuit,
the telephone network interface circuit, and
a second wireless transceiver adapted to communicate with the handset.

26. The control device of claim 25 wherein the mode switch comprises a dedicated button on the handset.

27. The control device of claim 25 wherein the user interface comprises a numeric keypad, and wherein the mode switch is adapted to detect a predetermined series of keypresses on the numeric keypad.

28. The control device of claim 25 wherein the output device comprises a display adapted to provide a visual indication of status data to a user regarding operation of the control device.

29. The control device of claim 28 wherein the status data indicated on the display indicates status of the security system when the control device is in the security system mode.

30. The control device of claim 25 wherein the output device comprises a sounder adapted to provide audible feedback to the user regarding operation of the control device.

* * * * *